(12) United States Patent
Anderson (10) Patent No.: US 11,893,578 B2
(45) Date of Patent: Feb. 6, 2024

(54) SYSTEM AND METHOD FOR ONLINE TRANSACTIONS USING CRYPTOGRAPHIC DIGITAL TOKENS (71) Applicant: Christopher Charles Anderson, West Sussex (GB)

(72) Inventor: Christopher Charles Anderson, West Sussex (GB)

( * ) Notice: Subject to any disclaimer, the term of this patent is extended or adjusted under 35 U.S.C. 154(b) by 329 days.

(21) Appl. No.: 17/273,714

(22) PCT Filed: Sep. 21, 2020

(86) PCT No.: PCT/IB2020/058759
§ 371 (c)(1),
(2) Date: Mar. 4, 2021

(87) PCT Pub. No.: WO2021/069990
PCT Pub. Date: Apr. 15, 2021

(65) Prior Publication Data
US 2022/0005032 A1    Jan. 6, 2022

(30) Foreign Application Priority Data
Oct. 11, 2019   (IN) .............................. 201911041279

(51) Int. Cl.
*G06Q 20/38* (2012.01)
*G06Q 20/06* (2012.01)
*G06Q 20/36* (2012.01)

(52) U.S. Cl.
CPC ... *G06Q 20/38215* (2013.01); *G06Q 20/0658* (2013.01); *G06Q 20/3674* (2013.01); *G06Q 20/3825* (2013.01)

(58) Field of Classification Search
None
See application file for complete search history.

(56) References Cited

U.S. PATENT DOCUMENTS 11,354,727 B2 * 6/2022 Yao ..................... H04L 9/0618
2017/0140408 A1   5/2017 Wuehler
(Continued)

FOREIGN PATENT DOCUMENTS

WO  WO 2019/090005  6/2014
WO  WO 2017/098519  6/2017
WO  WO 2019/072283  4/2019

OTHER PUBLICATIONS

International Search Report and Written Opinion received in PCT/IB2020/058759, dated Nov. 27, 2020, 13 pages.
(Continued)

*Primary Examiner* — Neha Patel
*Assistant Examiner* — Nicholas K Phan
(74) *Attorney, Agent, or Firm* — Klarquist Sparkman, LLP (57) ABSTRACT A system and method for online transactions using cryptographic digital tokens is disclosed. The system includes multiple interconnected transaction servers having corresponding digital ledgers. Each interconnected transaction server may include computer modules to facilitate establishment of a digital contract, generation of a smart contract and a cryptographic digital token corresponding to the digital contract, and storage of the digital contract, the smart contract, and the cryptographic digital token. The computer modules may also facilitate execution of the smart contract and transfer of the cryptographic digital token from a buyer to a seller. The method includes establishing the digital contract, generating the smart contract and the cryptographic digital coin corresponding to the digital contract, and storing the digital contract, the smart contract, and the cryptographic digital coin. The method also includes executing the smart contract and transferring the cryptographic digital coin from the buyer to the seller.

8 Claims, 7 Drawing Sheets

(56) References Cited

U.S. PATENT DOCUMENTS

| | | |
|---|---|---|
| 2018/0089758 A1 | 3/2018 | Stradling et al. |
| 2019/0080402 A1 | 3/2019 | Molinari et al. |
| 2019/0220836 A1 | 7/2019 | Caldwell |
| 2020/0042989 A1* | 2/2020 | Ramadoss ............ G06Q 20/065 |
| 2022/0277275 A1* | 9/2022 | Housser ............. G06Q 20/3825 |
| 2023/0131603 A1* | 4/2023 | Quigley ............. G06Q 30/0185 |
| | | 705/65 |

OTHER PUBLICATIONS

Mohanta et al., "An Overview of Smart Contract and Use cases in Blockchain Technology," IEEE-43488, Jul. 10-12, 2018, 4 pages.

Bal et al., "VeriSign: A Secure Contract Consensus Platform on the Blockchain with Amendment Functionality," Dec. 10, 2018, 4 pages.

Watanabe et al., "Blockchain Contract: A Complete Consensus using Blockchain," 2015 IEEE $4^{th}$ Global Conference on Consumer Electronics (GCCE), Oct. 27-30, 2015, 2 pages.

Tian et al., "Contract Coin: Toward Practical Contract Signing on Blockchain," part of Lecture Notes in Computer Science book series (LNCS, vol. 10701), Dec. 8, 2017 (Abstract only).

\* cited by examiner

SYSTEM AND METHOD FOR ONLINE TRANSACTIONS USING CRYPTOGRAPHIC DIGITAL TOKENS

CROSS REFERENCE TO RELATED APPLICATIONS

This is the U.S. National Stage of International Application No. PCT/IB2020/058759 filed Sep. 21, 2020, which is to be published in English under PCT Article 21(2), which in turn claims the benefit of India Application No. 201911041279, filed Oct. 11, 2019, both of which are hereby incorporated herein by reference.

FIELD OF INVENTION

The present disclosure relates in general to the field of online transactions and more particularly, to use of cryptographic digital tokens generated from digital contracts for online transactions.

BACKGROUND OF THE INVENTION

In recent times, individuals and businesses rely primarily on online transactions to negotiate deals, transfer money, make purchases, offer services, and sell products. Typically, the online transactions between two or more entities, such a seller and a buyer, are facilitated by third party mobile and/or web applications. Oftentimes, the third-party mobile and/or web applications may not provide a private interaction between the seller and the buyer. In some instances, the seller and/or the buyer may also intend to establish a digital contract or agreement that is legally valid and binding prior to conducting the online transactions.

More recently, with an advent of smart contracts deployed on blockchain networks, peer-to-peer private interactions, agreements, and asset exchanges have been made possible. A blockchain network is a decentralised network having a plurality of nodes or servers, wherein each node includes a digital ledger. The digital ledger holds timestamped records of the online transactions such as date and time of the online transactions, type of the online transactions, details of the online transactions, and other details related to the online transactions. Each node may synchronise the digital ledger with respect to other nodes in the blockchain network and validate an authenticity of each online transaction. A smart contract consists of one or more computer programs that may be automatically executed on a specific date and time.

However, problem arises when the seller and the buyer may need to negotiate different pricing details, terms, and/or conditions for a service or a product in the digital contract. In some instances, the digital contract may also need to be modified multiple times based on the negotiations between the buyer and the seller. Recording the negotiations and tracking the modifications may be also necessary to review multiple versions of the digital contract. Further, the seller and the buyer may also prefer a private, secure, and direct interaction with each other during the negotiation and the modification of the digital contract. In some instances, the online transactions may also require currency conversions for payments and settlements to be made. In such instances, facilitating currency exchange through alternate financial instruments such as the cryptographic tokens may be needed for the currency conversions and to ensure legality of the online transactions between the seller and the buyer.

SUMMARY OF THE INVENTION

The embodiments of the present disclosure described herein provide a system and a method for use of cryptographic digital tokens generated from a digital contract for online transactions.

An example of a system for online transactions includes a plurality of interconnected transaction servers. Each interconnected transaction server includes a digital ledger to keep timestamped records of the online transactions. The system may also include a first electronic device of a seller that is in communication with at least one interconnected transaction server of the plurality of interconnected transaction servers via a network. Further, the system may also include a second electronic device of a buyer that is in communication with the at least one interconnected transaction server of the plurality of interconnected transaction servers via the network. In addition, the system may include an online transaction platform provided by the at least one interconnected transaction server to facilitate the online transactions between the seller and the buyer. Each interconnected transaction server may include a contract creation module that facilitates establishment of a digital contract between the seller and the buyer on the online transaction platform via the first electronic device and the second electronic device respectively. The digital contract may include one or more contractual preconditions and one or more offerings to be exchanged between the seller and the buyer. Each interconnected transaction server may also include a smart contract generation module to generate a smart contract that includes one or more computer instructions corresponding to at least one contractual precondition of the one or more contractual preconditions. Further, each interconnected transaction server may include a token generation module to generate a cryptographic digital token corresponding to at least one offering of the one or more offerings in the digital contract. In addition, each interconnected transaction server may include a blockchain storage module to create and store timestamped records of the digital contract, the smart contract, and the cryptographic digital token in the digital ledger of the at least one interconnected transaction server and the plurality of interconnected transaction servers simultaneously. Each interconnected transaction server may also include a settlement module to execute the smart contract when the at least one contractual precondition is fulfilled by the seller and/or the buyer. The settlement module may also facilitate an online transfer of the cryptographic digital token from a payer digital wallet of the buyer to a payee digital wallet of the seller.

An example for a method for online transactions includes establishing a digital contract between a seller and a buyer. The establishment of the digital contract may include creating the digital contract by the seller or the buyer. The digital contract may include one or more contractual preconditions and one or more offerings to be exchanged between the seller and the buyer. The method also includes generating a smart contract that includes one or more computer instructions corresponding to at least one contractual precondition of the one or more contractual preconditions. Further, the method includes generating a cryptographic digital token corresponding to at least one offering of the one or more offerings in the digital contract. In addition, the method includes storing timestamped records of the digital contract, the smart contract, the cryptographic digital token in a plurality of digital ledgers simultaneously. Further, the method includes executing the smart contract when the at least one contractual precondition is fulfilled by the seller and/or the buyer. The method also includes transferring the cryptographic digital token from a payer digital account of the buyer to a payee digital account of the seller upon execution.

BRIEF DESCRIPTION OF DRAWINGS

The accompanying drawings, similar reference numerals, may refer to identical or functionally similar elements. These reference numerals are used in the detailed description to illustrate various embodiments and to explain various aspects and advantages of the present disclosure.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various embodiments of the present disclosure.

DETAILED DESCRIPTION

Figure 1:
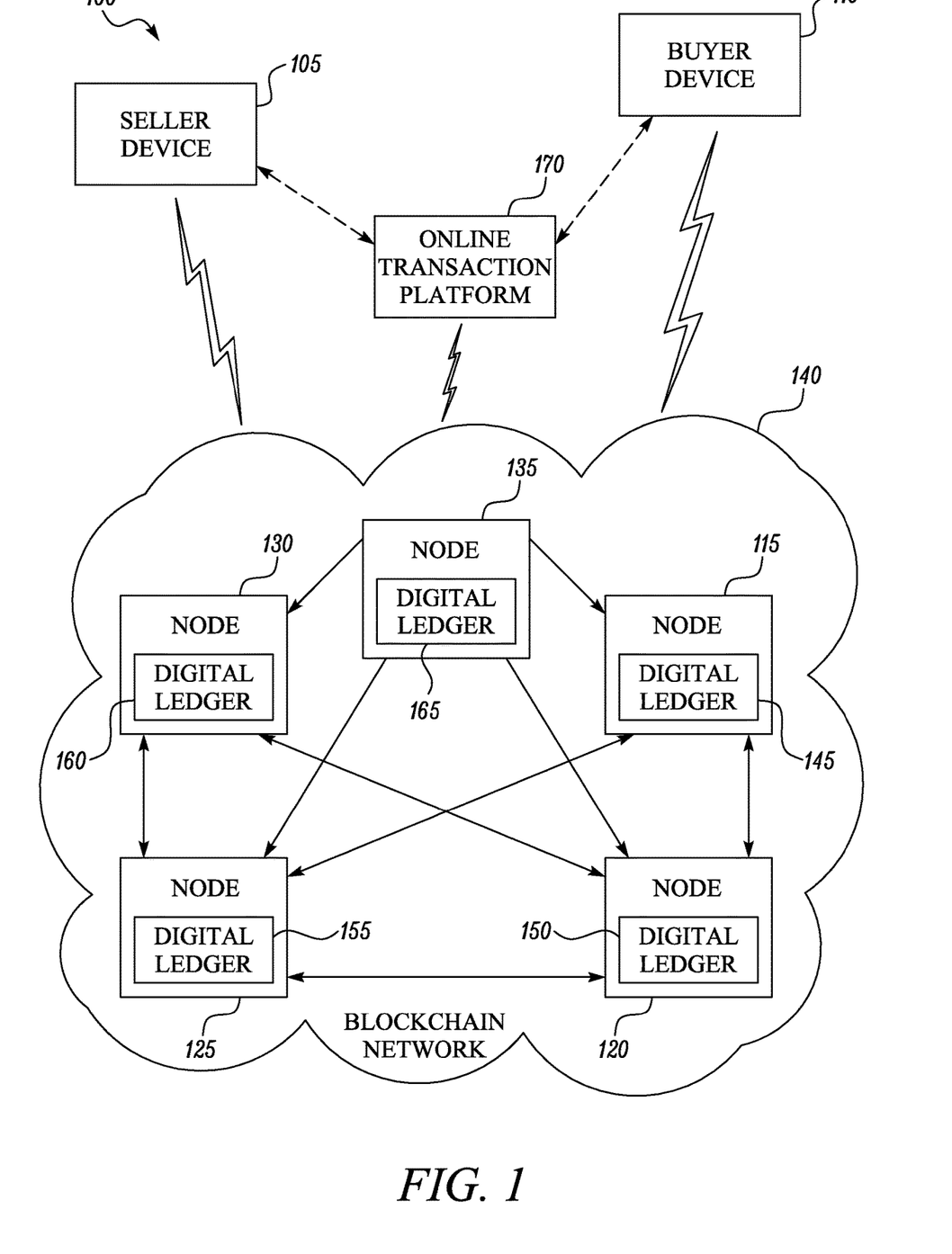
FIG. 1 is a schematic block diagram of an environment, in accordance with which various embodiments of the present disclosure may be implemented.

FIG. 1 is a schematic block diagram of an environment 100, in accordance with which various embodiments may be implemented. The environment 100 includes electronic devices, for example, a seller device 105 of a seller and a buyer device 110 of a buyer, in communication with a plurality of interconnected transaction servers 115-135 via a blockchain network 140. The interconnected transaction servers 115-135 are herein referred to as "nodes" 115-135. Each interconnected transaction server, for example, 115, 120, 125, 130, and 135, is herein referred to as a "node". The seller device 105 and the buyer device 110 correspond to electronic devices used by the seller and the buyer respectively. Examples of the electronic devices include, but are not limited to, computers, laptops, mobile devices, handheld devices, personal digital assistants (PDAs), tablet personal computers, digital notebook, and similar electronic devices. The nodes 115-135 may be interconnected via the blockchain network 140. The blockchain network 140 may include communication networks such as, but not limited to, a Local Area Network (LAN), a Wireless Local Area Network (WLAN), a Wide Area Network (WAN), internet and a Small Area Network (SAN). The nodes 115-135 interconnected by means of the communication networks corresponds to the blockchain network 140. Further, the nodes 115-135 may include digital ledgers 145-165 respectively to store timestamped records of the online transactions between the seller and the buyer. The nodes 115-135 may also provide an online transaction platform 170, to facilitate the online transactions between the seller and the buyer via the seller device 105 and the buyer device 110 respectively. The online transaction platform 170 may be provided as a stand-alone application and/or a web application on the seller device 105 and the buyer device 110 respectively.

In some embodiments, the nodes 115-135 may store the timestamped records of the online transactions in the digital ledgers 145-165 corresponding to one or more actions performed by a seller using the seller device 105 and/or a buyer using the buyer device 110. Examples of the actions include, but are not limited, creating a digital contract, uploading digital assets, and offering services or products for sale. The timestamped records may include information such as, but not limited to, date and time of the creation of the digital contract, date and time of updates made to the digital contract, name of the seller and/or the buyer involved in the digital contract, financial details corresponding to the digital contract, payment made by the buyer, and date and time of payments made by the buyer and/or received by the seller.

In some embodiments, the nodes 115-135 may assign unique numeric or alphanumeric hash values corresponding the timestamped records in order to track and uniquely identify the timestamped records. The nodes 115-135 may also encrypt the timestamped records of the online transactions prior to storing the timestamped records in the digital ledgers 145-165 respectively. The nodes 115-135 may employ different encryption methods, such as, for example, Advanced Encryption Standard (AES), Triple Data Encryption Standard (3DES), Pretty Good Privacy (PGP), Twofish, Ron Rivest, Adi Shamir and Len Adelman (RSA). For purposes of clarity and understanding, the RSA encryption method will be considered in the present disclosure. The RSA method involves use of cryptographic keys to store the timestamped records in the digital ledgers 145-165 and/or share the timestamped records between the nodes 115-135 via the blockchain network 140. The cryptographic keys may include public keys, private keys, or a combination of both public and private keys, the combination referred to as a "key-pair". The cryptographic keys or key-pairs may be used to keep the stored timestamped records digitally locked for security and privacy. The seller and/or the buyer may also share the cryptographic keys or key pairs with each other privately in order to decrypt and view the stored timestamped records using the cryptographic keys or key-pairs. In some embodiments, the cryptographic keys or key pairs may also uniquely identify the timestamped records in the digital ledgers 145-165.

In some embodiments, a node, for example, the node 115, may share the encrypted timestamped records in with other nodes, for example, nodes 120-135, using the cryptographic keys and the numeric or alphanumeric hash values associated with the cryptographic keys. The encrypted timestamped records may be stored in the digital ledgers 145-165 simultaneously after a consensus between the nodes 115-135 is ascertained. The consensus may be ascertained by validating the numeric or alphanumeric hash values and cryptographic keys at the nodes 115-135 independently, verifying accuracy of the timestamped records, and aggregating responses at each node, for example, the node 115. The sharing and verification of the timestamped records at the nodes 115-135 respectively ensures privacy, security, accuracy, and validation of the timestamped records at the nodes 115-165. Accordingly, each digital ledger, for example, the digital ledger 145 may include similar and up-to-date timestamped records of the online transactions as the other digital ledgers, for example, 150-165 at a specific point in time.

In some embodiments, the blockchain network 140 may also facilitate private and secure online transactions, herein referred to as "peer-to-peer" transactions, between the seller device 105 and the buyer device 110 via the online transaction platform 170. Examples of the online transactions include, but are not limited to, sale and/or transfer of digital assets such as media files, cryptocurrency, cryptographic tokens, currency, and digital contracts.

It may be apparent that various alternative arrangements of the nodes 115-135, the digital ledgers 145-165, and the electronic devices, such as the seller device 105 and buyer device 110 may be implemented to facilitate the online transactions between the seller and the buyer. For example, in some embodiments, the environment 100 may include multiple blockchain networks with multiple interconnected nodes similar to the blockchain network 140 and the nodes 115-135 respectively described herein.

Figure 2:
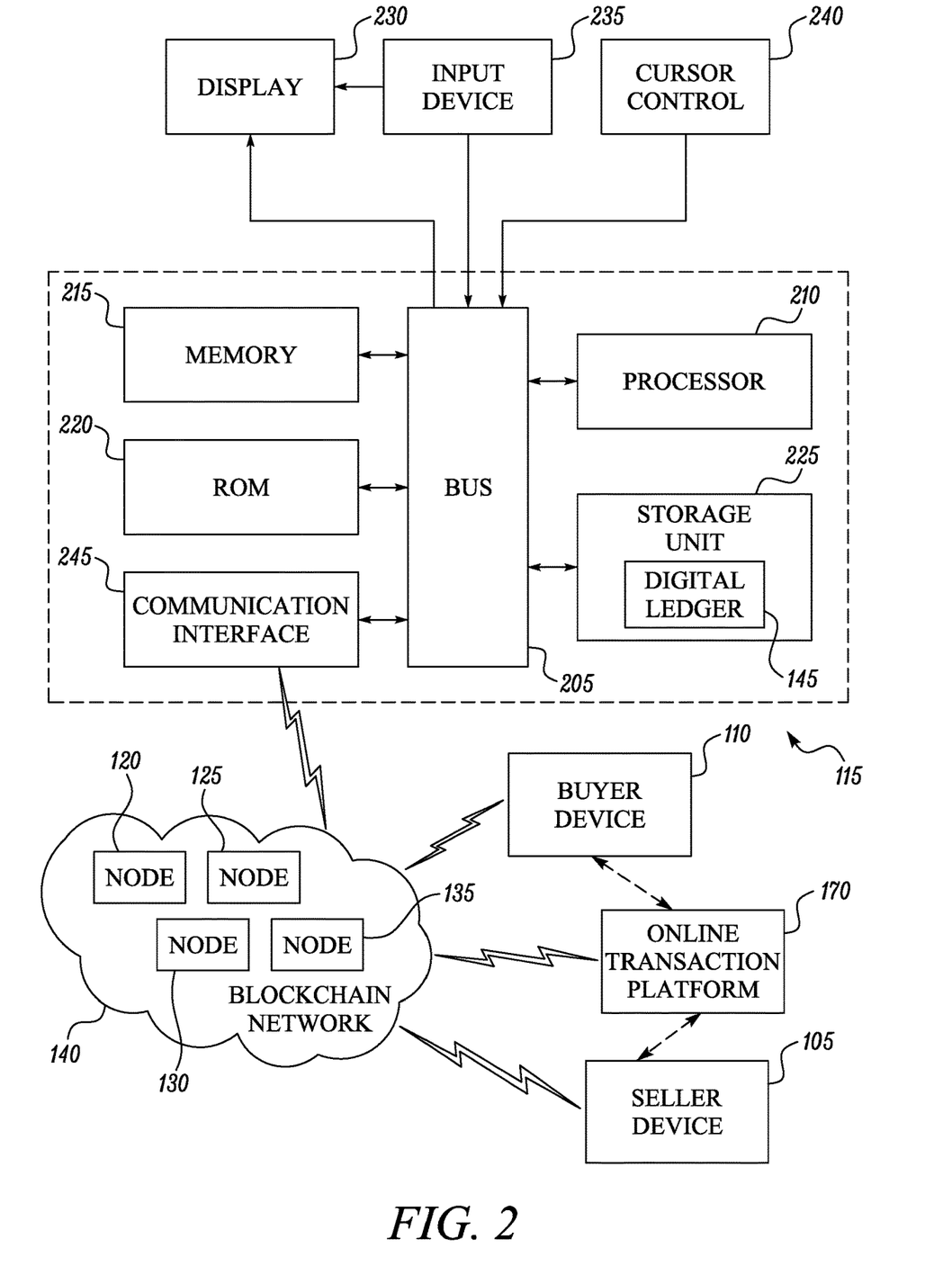
FIG. 2 is a schematic block diagram of a node in a blockchain network, in accordance with an embodiment of the present disclosure.

FIG. 2 is a block diagram of the node 115 in the blockchain network 140 of FIG. 1. The node 115 includes a bus 205 or other communication mechanism for communicating information, and a processor 210 coupled with the bus 205 for processing information. The node 115 also includes a memory 215, such as a random-access memory (RAM) or other dynamic storage device, coupled to the bus 205 for storing information and instructions to be executed by the processor 210. The memory 215 can be used for storing temporary variables or other intermediate information during execution of instructions to be executed by the processor 210. The node 115 further includes a read only memory (ROM) 220 or other static storage device coupled to bus 205 for storing static information and instructions for processor 210. A storage unit 225, such as a magnetic disk or optical disk, is provided and coupled to the bus 205. The storage unit 225 may also include a digital ledger 145 for storing timestamped records of online transactions between a seller and a buyer on an online transaction platform 170 provided by the node 115 and/or other nodes 120-135 in the blockchain network 140 as shown in FIG. 1.

The node 115 can be coupled via the bus 205 to a display 230, such as a cathode ray tube (CRT), and liquid crystal display (LCD) for displaying information to a user. An input device 235, including alphanumeric and other keys, is coupled to bus 205 for communicating information and command selections to the processor 210. Another type of user input device is a cursor control 240, such as a mouse, a trackball, or cursor direction keys for communicating direction information and command selections to the processor 210 and for controlling cursor movement on the display 230. The input device 235 can also be included in the display 230, for example a touch screen.

Various embodiments are related to the use of node 115 for implementing the techniques described herein. In one embodiment, the techniques are performed by the node 115 in response to the processor 210 executing instructions included in the memory 215. Such instructions can be read into the memory 215 from another machine-readable medium, such as the storage unit 225. Execution of the instructions included in the memory 215 causes the processor 210 to perform the process steps described herein.

The term "machine-readable medium" as used herein refers to any medium that participates in providing data that causes a machine to operate in a specific fashion. In an embodiment implemented using the node 115, various machine-readable medium is involved, for example, in providing instructions to the processor 210 for execution. The machine-readable medium can be a storage media. Storage media includes both non-volatile media and volatile media. Non-volatile media includes, for example, optical or magnetic disks, such as storage unit 225. Volatile media includes dynamic memory, such as the memory 215. All such media must be tangible to enable the instructions carried by the media to be detected by a physical mechanism that reads the instructions into a machine.

Common forms of machine-readable medium include, for example, a floppy disk, a flexible disk, hard disk, magnetic tape, or any other magnetic medium, a CD-ROM, any other optical medium, punch cards, paper-tape, any other physical medium with patterns of holes, a RAM, a PROM, and EPROM, a FLASH-EPROM, any other memory chip or cartridge.

In another embodiment, the machine-readable medium can be a transmission media including coaxial cables, copper wire and fibre optics, including the wires that comprise the bus 205. Transmission media can also take the form of acoustic or light waves, such as those generated during radio-wave and infra-red data communications. Examples of machine-readable medium may include but are not limited to a carrier wave as describer hereinafter or any other medium from which the node 115 can read, for example online software, download links, installation links, and online links. For example, the instructions can initially be carried on a magnetic disk of a remote computer. The remote computer can load the instructions into its dynamic memory and send the instructions over a telephone line using a modem. A modem local to the node 115 can receive the data on the telephone line and use an infra-red transmitter to convert the data to an infra-red signal. An infra-red detector can receive the data carried in the infra-red signal and appropriate circuitry can place the data on the bus 205. The bus 205 carries the data to the memory 215, from which the processor 210 retrieves and executes the instructions. The instructions received by the memory 215 can optionally be stored on storage unit 225 either before or after execution by the processor 210. All such media must be tangible to enable the instructions carried by the media to be detected by a physical mechanism that reads the instructions into a machine.

The node 115 also includes a communication interface 245 coupled to the bus 205. The communication interface 245 provides a two-way data communication coupling to the network 140. For example, the communication interface 245 can be an integrated service digital network (ISDN) card or a modem to provide a data communication connection to a corresponding type of telephone line. As another example, the communication interface 245 can be a local area network (LAN) card to provide a data communication connection to a compatible LAN. Wireless links can also be implemented. In any such implementation, the communication interface 245 sends and receives electrical, electromagnetic or optical signals that carry digital data streams representing various types of information.

Figure 3:
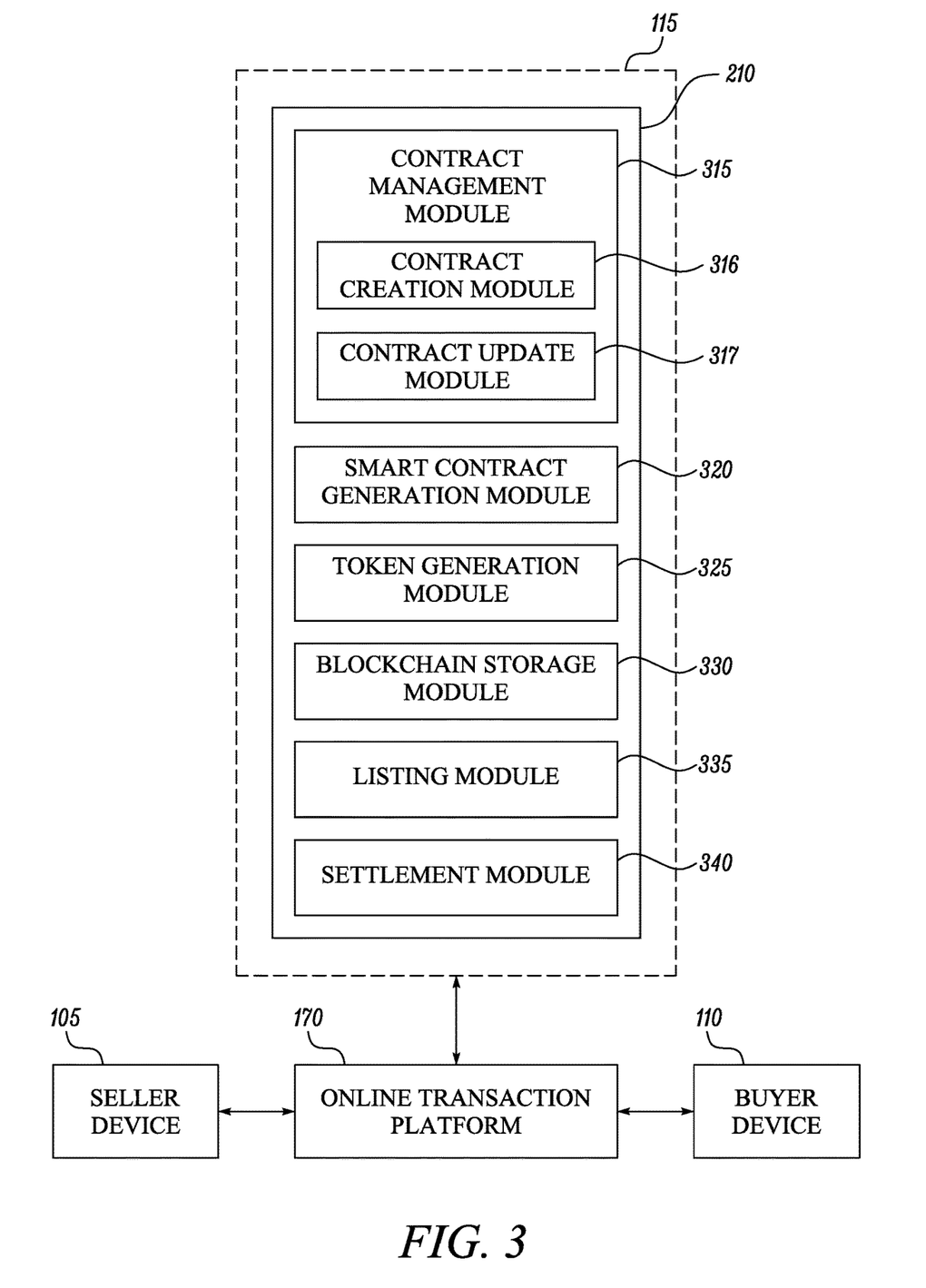
FIG. 3 is a schematic block diagram of one or more computer modules in a processor of the node of FIG. 2, in accordance to the embodiment of the present disclosure.

In some embodiments, the processor 210 of the node 115 may be capable of executing the one or more predefined computer instructions in order to perform one or more functions. Referring to FIGS. 2-3, the processor 210 may also include one or more computer modules 315-340 to perform the one or more functions. The processor 210 may include a contract management system 315 having a contract creation module 316 and a contract update module 317. The processor 210 may also include a smart contract generation module 320, a token generation module 325, a blockchain storage module 330, a listing module 335, and a settlement module 140. The computer modules 315-340, may be proprietary software programs included in the node 115 and/or the nodes 120-135 (see FIG. 1) to perform the one or more functions.

The contract creation module 316 facilitates establishment of a digital contract between the seller and the buyer on the online transaction platform 170 provided by the node 115. The seller and/or the buyer may establish the digital contract via the seller device 105 and/or the buyer device 110 respectively. The online transaction platform 170 may be provided to the seller and/or the buyer via a stand-alone application or a web application on the seller device 105 and the buyer device 110 respectively. In some embodiments, the contract creation module 316 may enable the seller or the buyer to create the digital contract in a natural language format on the online transaction platform 170. The contract creation module 316 may further enable the seller and/or the buyer to include one or more contractual preconditions and one or more offerings in the digital contract in the natural language format via the online transaction platform 170. Examples of the one or more contractual preconditions include, but are not limited to, terms of use and conditions set by the seller and/or the buyer, date and time of delivery of products and/or services, date and time of payments to be made, privacy policy, and additional requirements set by the seller and/or the buyer in the digital contract. Examples of the one or more offerings include, but are not limited to, products and/or services offered by the seller, price of the products and/or services set by the seller, offer made by the buyer corresponding the products and/or services provided by the seller, and/or additional perks or benefits offered by the seller or the buyer. The contract creation module 316 may enable the seller or the buyer to set pricing details corresponding to one or more offerings, such as the products and/or services in the contract. The contract creation module 316 may also enable the seller or the buyer to create a single digital contract for one offering or multiple offerings. For example, the contract creation module 316 may enable the seller to create one digital contract for multiple services or a single service. Further, the contract creation module 316 may also enable the seller and/or the buyer to create multiple digital contracts with different pricing details corresponding to multiple offerings respectively. The one or more contractual preconditions, the one or more offerings, and the one or more pricing details corresponding to the one or more offerings will be herein collectively referred to as "contract details" in the present disclosure.

In some embodiments, the contract creation module 316 may enable the seller and the buyer to negotiate the contract details online. The contract creation module 316 may enable the seller and the buyer to negotiate the one or more contractual preconditions, the one or more offerings, and/or the pricing details in the contract details. In one embodiment, the contract creation module 316 may enable the online negotiation by means of software applications such as, but not limited to, chat, contract notes, and contract editing tools provided on the online transaction platform 170 (see FIG. 1). In another embodiment, the contract creation module 316 may facilitate the online negotiation by means of real-time editing of the digital contract by the seller and/or the buyer during the creation of the digital contract on the online transaction platform 170. In yet another embodiment, the contract creation module 316 may facilitate the online negotiation by means of mutual exchange of the digital contract between the seller and buyer in one or more digital formats, such as, for example, a portable document format on the online transaction platform 170. In some embodiments, the contract creation module 316 may facilitate encryption of the online negotiation for privacy and security. For instances when the contract creation module 316 encrypts the online negotiation, the seller and the buyer may need cryptographic keys or key pairs to access and/or edit the digital contract. In some embodiments, the contract creation module 316 may also require the seller and/or the buyer to pre-set a personal identification number in addition to the cryptographic keys or key pairs to access and/or edit the digital contract. Further, the contract creation module 316 enable the seller or the buyer to change the contract details in the digital contract during the online negotiation. Further, the contract creation module 316 enables the seller and/or the buyer to finalise the contract details based on the online negotiation and establish the digital contract.

The smart contract generation module 320 facilitates automatic conversion of the contract details included in the digital contract from the natural language format to a legal format having one or more contractual clauses. The smart contract generation module 320 may employ template automation techniques to convert the contract details in the natural language format to the legal format. In some embodiments, the smart contract generation module 320 may interact with one or more application programming interfaces (APIs) to implement the template automation techniques. The digital contract in the legal format having the one or more contractual clauses will herein be referred to as a "real-world" contract in the present disclosure. The real-world contract generated as a result of the automatic conversion by the smart contract generation module 320, may also enable the seller or the buyer to comply with legal requirements as applicable to one or more geographical locations associated with the seller and/or the buyer.

The smart contract generation module 320 also generates a smart contract corresponding to at least one contractual precondition of the one or more contractual preconditions in the contract details included in the real-world contract. The smart contract may include one or more computer instructions generated corresponding to the contractual precondition included in the real-world contract. For example, the smart contract may include a computer instruction to send an online reminder to the seller and/or the buyer on a specified date and time as included in the real-world contract.

The token generation module 325 generates a cryptographic digital token, herein referred to as a "token coin", corresponding to at least one offering of the one or more offerings in the contract details included in the real-world contract. The token coin may be generated corresponding to the pricing details of the offering in the real-world contract. In some embodiments, the token generation module 325 may assign a symbolic monetary value equivalent to a cumulative price of the offerings in the real-world contract to the token coin.

The blockchain storage module 330 creates timestamped records of the real-world contract, the smart contract, and the token coin. The blockchain storage module 330 may assign unique numeric or alphanumeric hash values corresponding to the timestamped records of the real-world contract, the smart contract, and the token coin respectively in order to group, track, and uniquely identify the timestamped records. In some embodiments, the blockchain storage module 330 may assign a common unique numeric or alphanumeric hash value corresponding to the timestamped records of the real-world contract, the smart contract, and the token coin upon establishing the digital contract via the contract creation module 316. The blockchain storage module 330 may also employ one or more encryption methods to encrypt the timestamped records of real-world contract, the smart contract, and the token coin. The blockchain storage module 330 may also generate the cryptographic key-pairs corresponding to the encrypted timestamped records of the real-world contract to enable the seller and/or the buyer to access the real-world contract privately and securely. In some embodiments, the blockchain storage module 330 may randomise the contract details in the real-world contract during encryption.

The blockchain storage module 330 may store the encrypted timestamped records in the digital ledger 145 of the node 115. In some embodiments, blockchain storage module 330 may share the encrypted timestamped records and the numeric or alphanumeric hash values associated with the encrypted timestamped records in with other nodes, for example, nodes 120-135 (see FIG. 1). The encrypted timestamped records may also be stored and/or updated in the digital ledgers 145-165 (see FIG. 1) simultaneously after a consensus between the nodes 115-135 is ascertained. The consensus may be ascertained by the blockchain storage module 330 through validation of the numeric or alphanumeric hash values and the cryptographic keys at the nodes 120-135 independently, verification of accuracy of the timestamped records at the nodes 120-135 independently, and aggregating responses related to the validation and the verification from the nodes 120-135.

The listing module 335 publicly lists the real-world contract and/or the token coin generated corresponding to the real-world contract on the online transaction platform 170 after the encrypted timestamped records are stored by the blockchain storage module 325. The listing module 335 may also present a monetary valuation of the real-world contract as determined by the symbolic monetary value of the token coin in the public listing. The listing module 335 may also send the encrypted real-world contract to the seller and/or buyer directly for private access using the cryptographic key-pairs. In some embodiments, the listing module 335 may send the encrypted real-world contract to a digital wallet of the seller and/or the buyer.

The settlement module 340 executes the smart contract when the at least one contractual precondition is fulfilled by the seller and/or the buyer. Further, the smart contract may be executed automatically on a specific date and time as included in the real-world contract. Examples of the fulfilment of the contractual precondition include, but are not limited to, payments made by the buyer, services rendered by the seller, products delivered by the seller, or confirmation by the buyer of the products and/or services provided by the seller. Further, the settlement module 340 may facilitate online transfer of the token coin from a payer digital wallet of the buyer to a payee digital wallet of the seller. In some embodiments, the settlement module 340 may create a timestamped record of the online transfer in the digital ledgers 145-165 of the nodes 115-135 in the blockchain network 140 simultaneously. In addition, the settlement module 340 may also facilitate redemption of the token coin as financial currency in a financial account of the seller. The settlement module 340 may facilitate the exchange via various payment settlement means such as, but not limited to, banking transactions and digital wallet transactions. In some embodiment, the settlement module 340 may instruct the blockchain storage module 330 to update the symbolic monetary value of the token coin in the digital ledgers 145-165 after the redemption. The blockchain storage module 330 may reset or rebalance the symbolic monetary value of the token coin in the digital ledgers 145-165 to zero upon confirmation of the redemption by the settlement module 340.

In some embodiments, the contract update module 317 may enable the seller and/or the buyer to access and update the real-world contract listed by the listing module 335 on the online transaction platform 330. The contract update module 317 may enable the seller and/or the buyer to access the real-world contract from the digital wallet of the seller and/or the buyer respectively. The seller and/or the buyer may use the cryptographic keys or key pairs to decrypt and access the real-world contract. The contract update module 317 may apply one or more decryption methods upon verification of the cryptographic keys or key pairs provided by the seller and/or the buyer. The decryption methods applied by the contract update module 317 may be similar to the encryption methods, for example, the RSA method, applied to the timestamped records. In some embodiments, the contract update module 317 may convert the real-world contract to the digital contract in the natural language format upon decryption. The contract update module 317 may enable the seller and/or the buyer to update the contract details, such as, the contractual preconditions, the offerings, and/or the pricing details included in the offerings.

Upon confirmation of the digital contract being updated by the contract update module 317, the smart contract generation module 320 may convert the digital contract in the natural language format to an updated real-world contract including the updated contractual preconditions, the offerings, and/or the pricing details. The updated real-world contract corresponds to the digital contract in the legal format having the one or more contractual clauses. The smart contract generation module 320 may also generate an updated smart contract corresponding to the updated contractual precondition in the updated real-world contract.

The token generation module 325 may generate an updated token coin corresponding to the updated offerings or the updated pricing details included in the updated offerings. The blockchain storage module 330 may store timestamped records of the updated real-world contract, the updated smart contract, the updated token coin in the digital ledgers 145-165 of the nodes 115-135 simultaneously in the blockchain network 140. The blockchain storage module 330 may apply one or more encryption methods prior to recoding the updated real-world contract, updated smart contract, and the updated token coin in the blockchain network 140. In some embodiments, the blockchain storage module 330 may randomise the updated contract details in the updated real-world contract during encryption. The blockchain storage module 330 may store the timestamped records after the consensus is ascertained with the nodes 115-135 in the blockchain network 140. Further, the settlement module 340 may execute the updated smart contract stored by the blockchain storage module 330 when the updated contractual precondition is fulfilled by the seller and/or the buyer. The settlement module 340 may also facilitate the online transfer of the updated token coin from the payer digital wallet of the buyer to the payee digital of the seller.

It may be apparent from FIGS. 1-3 that that the seller device 105 and/or the buyer device 110 may also perform the online transactions via the online transaction platform 170 provided by other nodes 120-135, similar to the node 115. For example, the seller device 105 may perform the online transactions via the online transaction platform 170 provided by the node 115 and the buyer device 110 may perform the online transactions via the online transaction platform 170 provided by the node 120. Accordingly, the timestamped records of online transactions performed by the seller corresponding to the node 115 and the timestamped records of online transactions performed by the buyer corresponding to the node 120 are recorded in the digital ledgers 145-165 simultaneously upon ascertaining the consensus between the nodes 115-135 independently.

INDUSTRIAL APPLICABILITY

Figure 4:
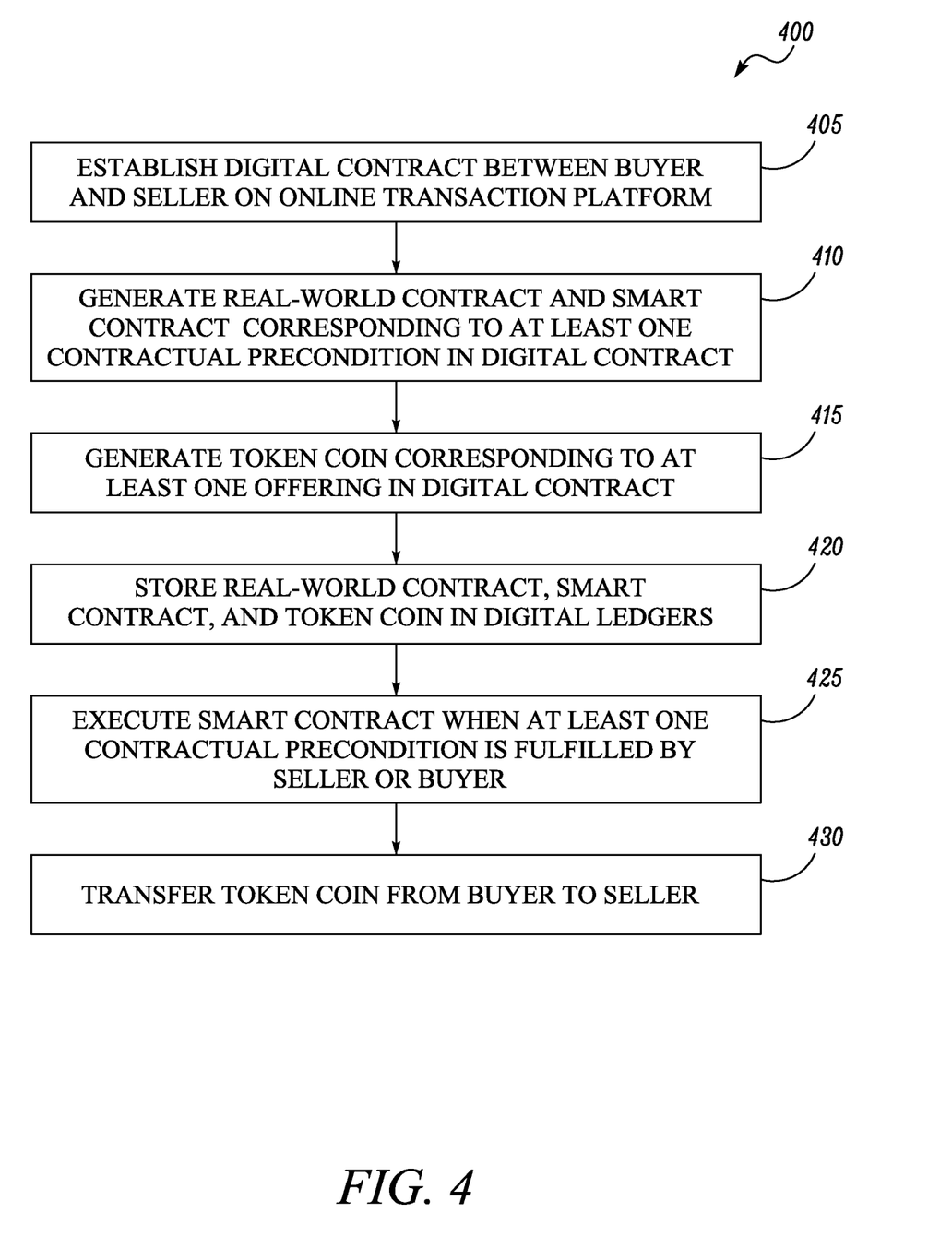
FIG. 4 is a flowchart of a method for online transactions, in accordance with the embodiment of the present disclosure.

Referring to FIG. 4, a flowchart of a method 400 for online transactions is disclosed. The method 400 includes a step 405 of establishing a digital contract between a seller and a buyer on an online transaction platform 170 (see FIGS. 1-3). The online transaction platform 170 may be provided by a node, such as, the node 115 (see FIGS. 1-3) in the blockchain network 140 (see FIGS. 1-3).

Figure 5:
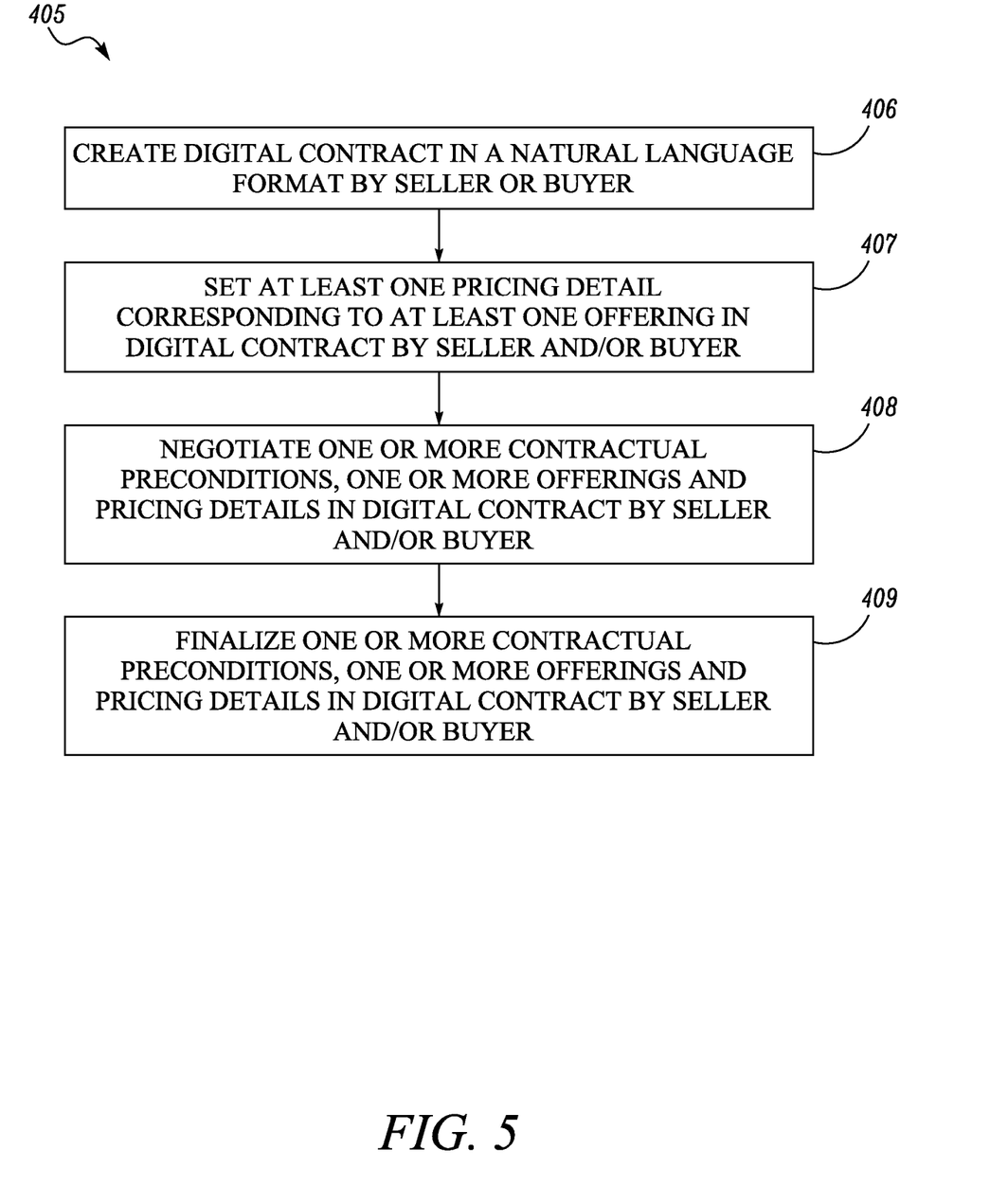
FIG. 5 is a flowchart of a method for establishing a digital contract, in accordance with the embodiment of the present disclosure.

Referring to FIG. 4-5, the step 405 may include additional steps 406-408. Accordingly, the step 405 may include the step 406 of creating the digital contract by the seller or the buyer by including contract details, such as, one or more contractual preconditions and one or more offerings to be exchanged between the seller and the buyer. The seller or the buyer may create the digital contract by means of a stand-alone application or a web application provided on the seller device 105 or the buyer device 110 respectively. The seller or the buyer may create the digital contract in a natural language format.

The step 405 may also include the step 407 of setting at least one pricing detail corresponding to the one or more offerings, such as products and/or services, in the digital contract. Examples of the services may include, but not limited to, artist performance fees, licensing fees, and related service fees. Examples of the products may include, but are not limited, digital or tangible artefacts, digital media, physical products, and additional complementary products. The seller or the buyer may set a single pricing detail for multiple offerings or set multiple pricing details corresponding to the multiple offerings in the digital contract. In some embodiments, the seller or the buyer may create multiple digital contracts with different pricing details corresponding to the multiple offerings in each digital contract.

The step 405 may also include step 408 of negotiating the one or more contractual preconditions, the one or more offerings, and the pricing details in the contract details between the seller and the buyer online. The negotiation may be via one or more online communication means, such as, chat and messages, between the seller and the buyer. The step 405 may also include a step (not shown) of encrypting the online negotiation between the seller and the buyer to ensure privacy and security.

The step 405 may also include the step 409 of finalizing the contract details based on the negotiation by the seller and/or the buyer on the online transaction platform 170 (see FIGS. 1-3).

In some embodiments, the steps of creating the digital contract, setting the pricing details, negotiating and finalizing the contract details in step 405 may be executed by multiple nodes in multiple blockchain networks, such as, blockchain network 140 (see FIG. 1).

Referring again to FIG. 4, the method 400 includes at step 410 of converting the digital contract in the natural language format to the real-world contract automatically. The real-world contract may correspond to the digital contract in the legal format having the one or more contractual clauses. The one or more contractual clauses may include the contract details, such as, the one or more contractual preconditions and the one or more offerings. The step 410 may further include a step of generating a smart contract corresponding to at least one contractual precondition of the one or more contractual preconditions in the real-world contract. The smart contract may include one or more computer instructions generated corresponding to at least one contractual precondition in the contract details. The computer instructions in the smart contract may be correspond to specific automated actions to be performed, such as sending reminders, confirming delivery of service and/or product, and confirming payments, on a specified date and time as included in the real-world contract. In some embodiments, the smart contract may control the sale or transfer of a digital asset, such as, the token coin, on a specific date and time to the seller as included in the real-world contract.

An exemplary implementation and example of the step 405 of establishing the digital contract by the seller in the natural language format may be as follows:

Bookings start at [0-100,000 USD].
 Sessions require [1-51] [days—weeks—months] advanced notice. Rush requests [can—will not] be considered.
 [Open—Specific] requests are reviewed. [0|100-100|0] creative freedom is expected.
 [Feel free to—Please do not] reference other tattoo artist's work. [0-10] visual references and body placement photos are best. Cover-up requests [will—will not] be reviewed.
 There is [a—no] charge to create or edit custom artwork. Details of a proposed venue [are—are not] required. Draft reviews of my work [are—are not] scheduled.
Other/s
 Your final invoice could have [0%-100%] variation.
 For cancellations or no-shows, you pay [0%-100%] of a venue's reservation price. You may be charged [0%-100%] if you cancel or [0%-100%] within 48 hrs of your session.
 [0%-100%] is charged for cancelling follow-up sessions.
 [0-100,000 USD] can be billed for change requests. Recordings and work can remain under copyright protection with IP Rights sold separately. You might be requested to send a photo of your healed tattoo/art following your session. Recordings and work can remain under copyright protection with IP Rights sold separately.
[Free/Text]
[CHECKBOX] I have read, understand and agree to these contract details
New Artwork
a. [new posting] notification to following PORTER & connected members immediately
"[PROFILE LINK] just posted"
b. [new posting] notification to following members six hours after upload
"[Profile Link] posted"
(ii) CONFIRMED COLLABORATION
a. [month booking date] notification to commissioning member 28 days before set date "Just around a month to go before [LINK & COLLABORATION TITLE]!"
b. [two weeks booking date] notification to commissioning member 14 days before set date
"Only two weeks before [LINK & COLLABORATION TITLE]. Please keep your skin in good condition. Don't go sunbathing or damage your canvas!"
c. [24 hrs booking date] notification to commissioning member 24 hrs before set date "[LINK & COLLABO- RATION TITLE] is tomorrow! Please be sure get to plenty of rest tonight. Wear comfortable clothes and please eat something an hour or so before your session."

d. [following booking date] notification to commissioning member 1 hr after confirmed completion
"Congratulations! Please remember the next four weeks is a critical healing time. Keep your body/art clean. Avoid harsh or dirty environments. You can typically shower right away but do not submerge the area. Keep any protective cover fresh, change as often as needed. Wear loose-fitting clothes, allowing the area to breathe. Good aftercare is important. Specifics will depend on your daily routine and location."

e. [following booking date] notification to commissioning member 28 days after completion "Congratulations again! Please don't forget to send me a photo of the healed tattoo/art"

An exemplary implementation and example of the step 410 of converting the digital contract to the real-world contract may be as follows:

[TATTOO/ARTIST] ("Tattoo/Artist"), and [PURCHASING MEMBER] ("Purchasing Member"), agree to incorporate by reference the clauses 7.2a to 7.2o, associated documentation, and other written stipulations to form part of this collaboration contract [CONTRACT #] ("Contract")

WHAT|"[TEXT/COLLABORATION DESCRIPTION]" also as in [PHOTOS] ("Art/Work") ⸿ TERMS|Immediately upon the application of the Art/Work by the Tattoo/Artist, the Purchasing Member shall pay the fee due to the Tattoo/Artist in the amount and currency equivalent to [PRICE] ⸿ WHEN+WHERE ARTWORK IS APPLIED|[TEXT] ("Location") on or by [COMPLETION DATE]

[X] [Y] TOGETHER|Tattoo/Artist and Purchasing Member shall in good faith take every reasonable measure to maintain a suitable, safe, hygienic and comfortable working area, Location and environment during the Art/Work's application

[X] [Y] ORIGINAL WORK|Tattoo/Artist represents and warrants that to the best of his or her knowledge, the Art/Work assigned hereunder is original and has not previously been published, or that consent to use has been obtained on an unlimited and unconditional basis

[X] [Y] COPYRIGHT SOLD SEPARATELY|Purchasing Member enjoys non-commercial and personal use of the Art/Work. Purchasing Member shall not have any copyright, moral right or other intellectual property rights, titles or interests whatsoever to the Art/Work ("IP Rights"). Tattoo/Artist retains all IP Rights to the Art/Work, whether such rights arise from law, contract or other source of legal or equitable obligation. If Purchasing Member intends to obtain any such IP Rights, the concurrent or subsequent execution and registration of an IP Sales Contract between the former and the Tattoo/Artist (also known as "Owner"), shall necessarily be required

[X] [Y] NO EXTRA GUESTS|Except for those persons explicitly stipulated by both parties, Purchasing Member shall neither invite nor permit any additional persons, also known as Attendees, to access private, restricted or other similarly controlled areas utilized during the Art/Work's application

[X] [Y] NO RECORDING|Purchasing Member shall not permit any person to photograph, record, broadcast, communicate, digitally stream or in any manner whatsoever record, publish, share or transmit any copy, image or representation of the Art/Work, including any related conduct or activities of application

[X] [Y] DAMAGES|During the Art/Work's application Purchasing Member shall be comprehensively and personally liable to compensate the Tattoo/Artist or other third party, for any injury or illness sustained and for any damages caused to the said artist or party or to the equipment, working areas or Locations when said injury, illness or damages have been objectively evidenced or proven to have resulted from the act or omission involving fault or negligence of the Purchasing Member. Payable charges may include but not limited to verified costs incurred by Tattoo/Artist to compensate for, repair or replace similarly damaged equipment To the full extent permitted by law or equity, and notwithstanding anything else in this agreement, neither party shall be liable for any incidental, consequential, exemplary, punitive, indirect damages of any kind including lost profits, lost data, or costs of procuring substitute services, whether in an action in contract, quasi-contract, delict, quasi-delict or other source of legal or equitable obligation, even if such party has been advised of the possibility of such damages, except in cases of gross negligence or wilful misconduct

[X] [Y] CONFIDENTIAL|Tattoo/Artist and Purchasing Member agree to protect each other's confidential and proprietary information, otherwise known as private details. Each shall endeavour to do so for such information disclosed in the course of contract negotiations, perfection, implementation and consummation SET|The transfer or payment of the fee shall be deemed to confirm the successful completion of the Contract. A perfected and signed contract may not be modified, amended or supplemented except by the express written consent of both parties. Neither party may delegate its contract obligations except with the written consent of the other party. Neither party may assign its contract rights, such as the right to collect payment, without the written consent of the other party, which consent shall not be unreasonably withheld. General portfolio displays or depictions of the Art/Work on [TATTOO/ARTIST'S PROFILE] are permitted. Contract Dispute and Settlement Billings are to be ruled on by the Tribunal. Any situation resulting in litigation, initiated by either Party, shall be brought within the courts and governed by the laws of [TATTOO/ARTIST'S PROFILE LOCATION]

AGREED|PARTIES HAVE READ, UNDERSTOOD AND AGREE TO BE BOUND|Via electronic methods, personal signatures and private digital keys are inscribed on registered documents holding both Purchasing Member and Tattoo/Artist as formally, contractually, legally and equitably bound. Purchasing Member and Tattoo/Artist respectively acknowledges that he or she has been given adequate opportunity to review, bargain and agree with the contract details, including clauses 7.2a through 7.2o, associated documentation and has accepted each and every one of the legally, equitably or materially significant roles, liabilities, duties, risks, obligations and responsibilities contained therein. All information has been presented with ample time and space to allow for measured consideration by both parties, before official payment and registration of these contract details have been authorized by them| [SIGNING DATE]

Referring again to FIG. 4, the method 400 may also include at step 415 of generating a cryptographic digital token or the token coin corresponding to at least one offering of the one or more offerings in the contract details of the real-world contract. The token coin generated may correspond to a symbolic monetary value equivalent to a cumulative price of the offerings in the real-world contract.

Further, the method 400 may include a step 420 of storing a timestamped record of the real-world contract, the smart contract, and the token coin in multiple digital ledgers, such as, the digital ledgers 145-165 (as shown in FIG. 1) in the blockchain network 140 (as shown in FIG. 1) and/or multiple blockchain networks similar to the blockchain network 140. The step 420 may also include a step of assigning unique numeric or alphanumeric hash values to the real-world contract, the smart contract and the token coin for tracking, identification, and retrieval across digital ledgers, such as, the digital ledgers 145-165. The step 420 may also include a step of grouping the real-world contract, the smart contract and the generated token coin based on the unique numeric or alphanumeric hash values. In some embodiments, the real-world contract, the smart contract and the generated token coin may hold references to each other for tracking and identification. Further, the step 420 may also include a step of encrypting the contract details in the real-world contract using one or more encryption methods and generating cryptographic keys or key pairs corresponding to the encrypted real-world contract. The step of encryption may further include a step of randomising the contract details in the real-world contract.

Further, in some embodiments, the step 420 may be performed after a consensus between different nodes, such as the nodes 115-135 in the blockchain network 140 (see FIG. 1) is ascertained. The consensus may be ascertained by sharing the unique numeric or alphanumeric hash value and verifying the cryptographic key-pairs at the nodes 115-135 independently in the blockchain network 140. Timestamped records of the real-world contract, the smart contract, and the token coin may be stored in the digital ledgers 145-165 (see FIG. 1) at the nodes 115-135 after the verification. The sharing and verification between the nodes 115-135 ensure privacy, security, accuracy, and time-stamped validation of the real-world contract in the blockchain network 140.

In some embodiments, the method 400 may further include at step (not shown) of listing the encrypted real-world contract and the token coin publicly on the online transaction platform, for example, the online transaction platform 170 (see FIGS. 1-3). In some embodiments, the step of listing may also include listing the real-world contract and the token coin associated with the real-world contract in a digital wallet of the seller and/or the buyer directly for private access. The listing may also display the pricing details associated with the digital contract as determined by the symbolic monetary value of the token coin associated with the real-world contract. The seller or the buyer may use the cryptographic keys or key pairs to decrypt the encrypted real-world contract listed. The real-world contract may be converted to the digital contract in the natural language format upon decryption.

The method 400 may also include a step 425 of executing the stored smart contract when at least one precondition in the real-world contract is fulfilled by the seller and/or the buyer. The step 425 may performed on a specific date and time as included in the real-world contract. Further, the method 400 may also include a step 430 of transferring the stored token coin from the buyer to the seller. The token coin may be transferred from a payor digital wallet of the buyer to a payee digital wallet of the seller. The step 430 may also include a step of creating a timestamped record of the transfer of the token coin in digital ledgers, such as, the digital ledgers 145-165 (see FIG. 1) in the blockchain network 140 and/or the multiple blockchain networks similar to the blockchain network 140. In some embodiments, the method 400 may also include a step of redeeming the transferred token coin for financial currency by the seller via different payment settlement means such as banking transactions and digital wallet transactions. The method 400 may also include a step of rebalancing the symbolic monetary value of the token coin in the digital ledgers such as, the digital ledgers 145-165 after the redemption.

Figure 6:
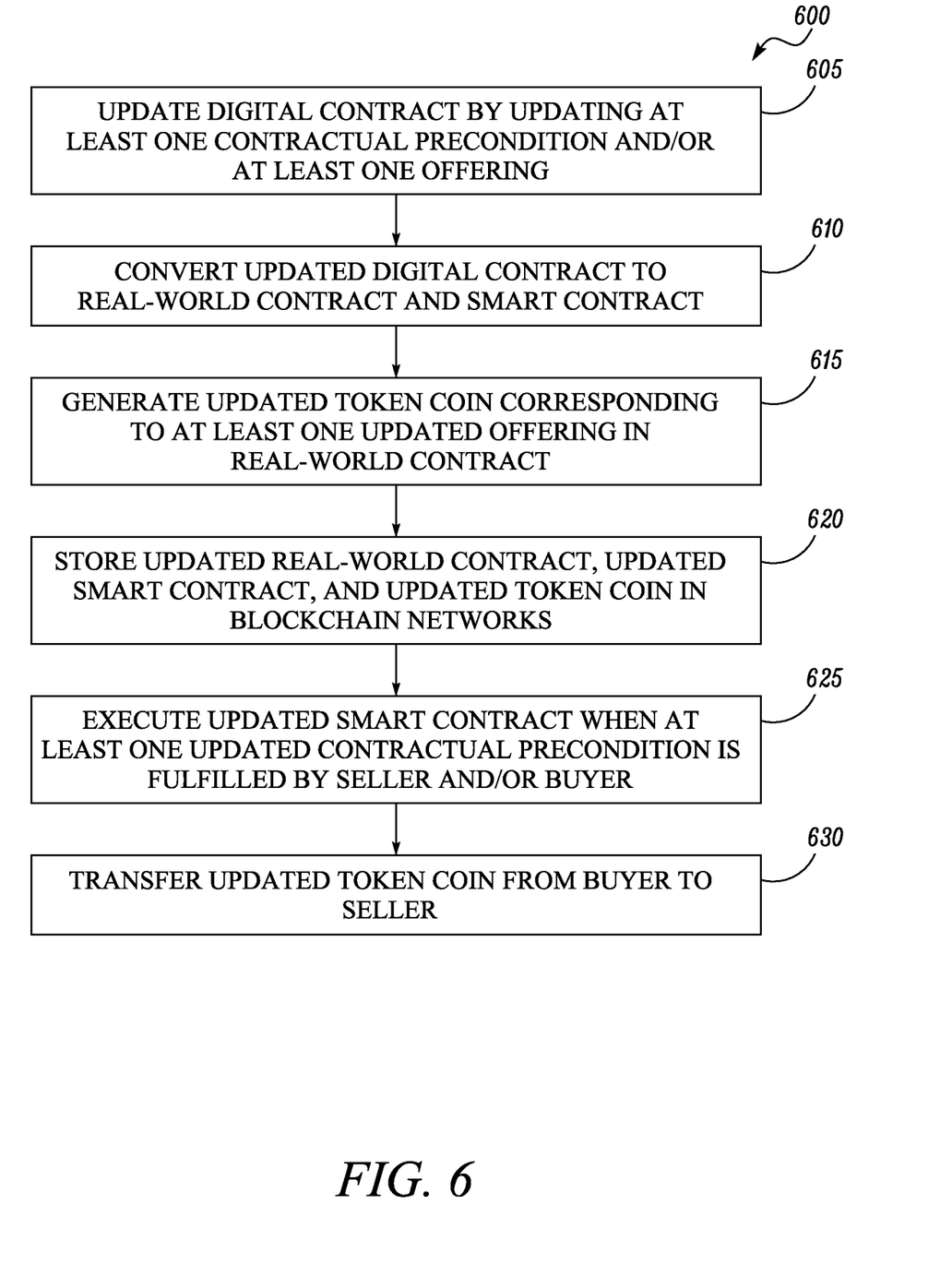
FIG. 6 is a flowchart of a method for online transactions by updating the digital contract of FIG. 5, in accordance with the embodiment of the present disclosure.

FIG. 6 is a flowchart of a method 600 for updating the stored real-world contract described with reference to FIG. 4 and FIG. 5. The method 600 may include a step of converting the stored real-world contract to a digital contract in a natural language format in order to facilitate the updating of the stored real-world contract. The conversion may include decryption of the stored real-world contract by means of cryptographic keys or key pairs by the seller and/or the buyer. Further, the method 600 may include a step 605 of updating the digital contract in the natural language format by the seller or the buyer. The step 605 may include a step of updating one or more contractual preconditions and/or one or more offerings in the contract details of the digital contract. The seller may also update pricing details corresponding to the one or more offerings in step 605.

The method 600 may also include a step 610 of converting the updated contract details including the pricing details in the digital contract to an updated real-world contract. The updated real-world contract may correspond to the updated digital contract in a legal format having one or more contractual clauses. The step 610 may also include a step of generating an updated smart contract corresponding the updated real-world contract. In addition, the method 600 includes a step 615 of generating an updated token coin corresponding to the updated pricing details of the updated offerings in the real-world contract.

Further, the method 600 may also include a step 620 of recording the updated real-world contract, the updated smart contract, and the updated token coin in the digital ledgers, such as the digital ledgers 145-165 (as shown in FIG. 1) in the blockchain network 140 (as shown in FIG. 1) and/or the multiple blockchain networks. In some embodiments, the step 620 include a step of assigning unique numeric or alphanumeric hash values to the updated real-world contract, the updated smart contract, and the updated token coin. In some embodiments, the step 620 may also include a step of encrypting the updated contract details in the updated real-world contract using one or more encryption methods. The encryption may further include randomising the contract details in the updated real-world contract. The step 620 may include a step of encrypting the updated smart contract and the updated token coin and generating cryptographic keys or key pairs.

In some embodiments, the step 620 may be initiated after a consensus is ascertained between different nodes, such as the nodes 115-135 in the blockchain network 140 (see FIG. 1). The consensus may be ascertained at by sharing the unique numeric or alphanumeric hash value among the nodes 115-135 and verifying the cryptographic key-pairs at the nodes 115-135 independently in the blockchain network 140. Timestamped records of the updated real-world contract, the updated smart contract, and the updated token coin may be stored and recorded in the digital ledgers 145-165 at the nodes 115-135 after the verification.

The method 600 may also include a step 625 of executing the updated smart contract recorded in the step 620 when at least one precondition in the updated real-world contract is fulfilled by the seller and/or the buyer. The step 625 may performed on a specific date and time as stated in the updated real-world contract. Further, the method 600 may also include a step 630 of transferring the updated token coin from the buyer to the seller. The updated token coin may be transferred from a payor digital wallet of the buyer to a payee digital wallet of the seller. The step 630 may also include a step of creating a timestamped record of the transfer of the updated token coin in digital ledgers, such as, the digital ledgers 145-165 in the blockchain network 140 and/or similar multiple blockchain networks.

Figure 7:
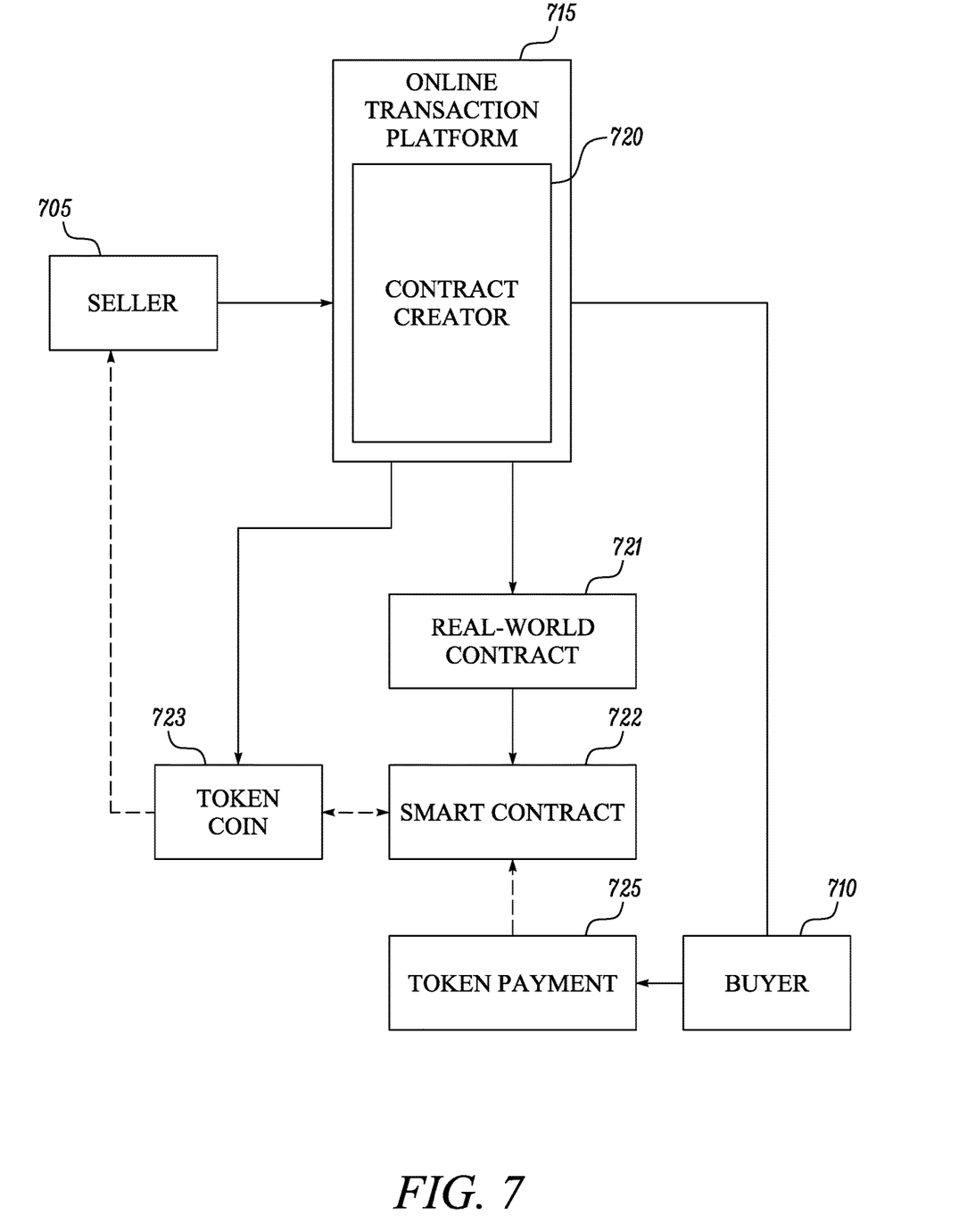
FIG. 7 is an exemplary illustration of an online transaction between a seller and a buyer via an online transaction platform in accordance with the embodiment of the present disclosure.

FIG. 7 is a schematic illustration of an exemplary implementation of an online transaction between a seller 705 and a buyer 710 via an online transaction platform 715 provided by at least one of the nodes, such as the nodes 115-135 (see FIGS. 1-3). The seller 705 and the buyer 710 may be registered users in the online transaction platform 715 with records of personal details, bank account details, and wallet details corresponding to the seller and/or the buyer available in the online transaction platform.

The seller 705 creates a digital contract 720 on the online transaction platform 715 to offer one or more products and/or services. The seller 705 may set a single price corresponding to the products and/or services in the digital contract 720. The seller 705 may also set multiple prices corresponding to the products and/or services in the digital contract 720. The seller 705 may also set additional contractual preconditions and offerings corresponding to the products and/or services in the digital contract 720. In some embodiments, the buyer 710 may communicate with the seller 705 via the online transaction platform 715 to negotiate the contract details, for example, the price or the multiple prices associated with the products and/or services provided by the seller 705, prior to or during the creation of the digital contract 720. The seller 705 and the buyer 710 may negotiate via chat, contract editing tools, and notes provided in the online transaction platform 715. Upon negotiation, the seller 705 or the buyer 710 may make changes to the contract details and the pricing in the digital contract 715. Accordingly, the seller 705 and the buyer 710 may come to an agreement, finalize the contract details, and establish the digital contract 720. The digital contract 720 established by the seller 705 or the buyer 710 is converted into a real-world contract 721 with one or more contractual clauses corresponding to the products and/or services and the associated contractual preconditions and offerings offered by the seller 705. A smart contract 722 is generated based on the contract details in the real-world contract 721. A token coin 723 may be generated corresponding to a price set by the seller 705 corresponding to the products and/or services. The token coin 723 with a cumulative price of the services and/or products may be generated when the seller 705 sets multiple prices corresponding to the products and/or services. The seller 705 may choose to send the real-world contract 721 to the buyer 710 directly and privately via the online transaction platform 715. The seller 705 may also choose to list the real-world contract 721 and the token coin 723 publicly and invite the buyer 710 to access the real-world contract 721.

In some embodiments, the seller 705 or the buyer 710 may wish to update the contract details in the real-world contract 721. Accordingly, the seller 705 or the buyer 710 make changes to the contract details, such as the pricing details, the contractual preconditions, and/or the offerings in the real-world contract 721. The changes made to the real-world contract 721 generates an updated real-world contract 721 and an updated smart contract 722. An updated token coin 723 may be generated corresponding to the change in the pricing details of the products and/or services in the updated real-world contract 721. Upon final agreement between the seller 705 and the buyer 710, the buyer 710 may make a token payment 725 corresponding to a monetary value of the updated token coin 723. The token payment 725 may be equivalent to the monetary value of the updated token coin 723. In some embodiments, the token payment 725 may a partial initial payment corresponding to the monetary value of the updated token coin 723. The buyer 710 may confirm the receipt of the services and/or products by the seller 705 on the online transaction platform 715. The smart contract 720 may then automatically make an additional token payment 725 corresponding to the updated value of the token coin 723 on behalf of the buyer 710 when a partial payment was made by the buyer 710 initially. Upon completion of the token payment 725, the token coin 723 may be transferred to a digital wallet assigned to the seller 705 in the online transaction platform 715. The seller 705 may redeem the transferred token coin 723 in the digital wallet for financial currency as preferred by the seller 705. Value of the token coin 723 may be rebalanced after the redemption. The financial currency may correspond to a local currency, cryptocurrency, or other forms of the financial currency. In some instances, the financial currency may be redeemed in a bank account owned by the seller 705.

In the preceding specification, the present disclosure and its advantages have been described with reference to specific embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of present disclosure.

I claim:

1. A system for one or more online transactions, comprising:
 a plurality of interconnected transaction servers, wherein each interconnected transaction server includes a digital ledger;
 a first electronic device of a seller in communication with at least one interconnected transaction server of the plurality of interconnected transaction servers via a network;
 a second electronic device of a buyer in communication with the at least one interconnected transaction server via the network; and
 an online transaction platform provided by the at least one interconnected transaction server to facilitate the one or more online transactions between the seller and the buyer via the network, wherein the at least one interconnected transaction server comprises a processor configured to:
  facilitate establishment of a first digital contract in a natural language format based on an encrypted online negotiation between the seller and the buyer on the online transaction platform via the first electronic device and the second electronic device respectively, the first digital contract including one

19 or more contractual preconditions and one or more offerings to be exchanged between the seller and the buyer;

automatically convert the first digital contract in the natural language format to a second digital contract in a legal format having one or more contractual clauses, the one or more contractual clauses including the one or more contractual preconditions and the one or more offerings;

generate a smart contract that includes one or more computer instructions corresponding to at least one contractual precondition of the one or more contractual preconditions;

generate a cryptographic digital token corresponding to the one or more offerings in the first or second digital contract;

assign a symbolic monetary value equivalent to a cumulative price of the one or more offerings to the cryptographic digital token generated;

store timestamped records of the first digital contract, the second digital contract, the smart contract, and the cryptographic digital token respectively in the digital ledger of the at least one interconnected transaction server and the plurality of interconnected transaction servers simultaneously; and execute the smart contract when the at least one contractual precondition is fulfilled by the seller, the buyer, or both the seller and the buyer, and facilitate an online transfer of the cryptographic digital token from a payer digital wallet of the buyer to a payee digital wallet of the seller.

2. The system of claim 1, wherein the processor is configured to facilitate:

creation of the first digital contract in a natural language format by the seller, the buyer, or both the seller and the buyer;

setting at least one pricing detail corresponding to the at least one offering by the seller, the buyer, or both the seller and the buyer;

the encrypted online negotiation of the one or more contractual preconditions, the one or more offerings, and the at least one pricing detail between the seller and the buyer; and finalizing the one or more contractual preconditions, the one or more offerings, and the at least one pricing detail based on the online negotiation by the seller, the buyer, or both the seller and the buyer, on the online transaction platform.

3. The system of claim 1, wherein the processor is configured to:

enable the seller, the buyer, or both the seller and the buyer, to update the first or second digital contract by updating at least one of the at least one contractual precondition and the at least one offering, generate an updated smart contract corresponding to the at least one updated contractual precondition, generate an updated cryptographic digital token corresponding to the at least one updated offering in the updated digital contract, store timestamped records of the updated digital contract, the updated smart contract, the updated cryptographic digital token respectively in the digital ledger of the at least one interconnected transaction server and the plurality of interconnected transaction servers simultaneously, and execute the updated smart contract when the at least one updated contractual precondition is fulfilled and facilitate the online transfer of the updated cryptographic digital token from the payer digital wallet of the buyer to the payee digital of the seller.

4. The system of claim 1, wherein the processor is configured to facilitate redemption of the cryptographic digital token as financial currency in a financial account of the seller and update the cryptographic digital token in the digital ledger after the redemption.

5. A method for one or more online transactions, comprising:

establishing a first digital contract in a natural language format to a second digital contract in a legal format having one or more contractual clauses, the one or more contractual clauses including the one or more contractual preconditions and the one or more offerings;

generating a smart contract that includes one or more computer instructions corresponding to at least one contractual precondition of the one or more contractual preconditions;

generating a cryptographic digital token corresponding to the one or more offerings in the first or second digital contract;

assigning a symbolic monetary value equivalent to a cumulative price of the one or more offerings to the cryptographic digital token generated;

storing timestamped records of the digital contract, the second digital contract, the smart contract, and the cryptographic digital token respectively in a plurality of digital ledgers simultaneously;

executing the smart contract when the at least one contractual precondition is fulfilled by the seller, the buyer, or both the seller and the buyer; and transferring the cryptographic digital token from a payer digital account of the buyer to a payee digital account of the seller upon execution.

6. The method of claim 5, wherein the creating of the s digital contract includes:

setting at least one pricing detail corresponding to the at least one offering by the seller, the buyer, or both the seller and the buyer;

negotiating the one or more contractual preconditions, the one or more offerings, and the at least one pricing detail between the seller and the buyer; and finalizing the one or more contractual preconditions, the one or more offerings, and the at least one pricing detail based on the negotiation by the seller, the buyer, or both the seller and the buyer, on an online transaction platform.

7. The method of claim 5, further including:

updating the first or second digital contract by the seller, the buyer, or both the seller and the buyer, wherein the updating includes updating the at least one contractual precondition and the at least one offering;

generating an updated smart contract corresponding to at least one updated contractual precondition in the updated digital contract;

generating an updated cryptographic digital token corresponding to at least one updated offering in the updated digital contract;

storing timestamped records of the updated digital contract, the updated smart contract, the updated cryptographic digital token respectively in the plurality of digital ledgers simultaneously;

executing the updated smart contract when the at least one updated contractual precondition is fulfilled by the seller, the buyer, or both the seller and the buyer; and facilitating the online transfer of the updated cryptographic digital token from the payer digital account of the buyer to the payee digital account of the seller.

8. One or more non-transitory computer-readable media comprising computer-executable instructions that, when executed by a computing system, cause the computing system to perform a method for one or more online transactions comprising:

establishing a first digital contract in a natural language format based on an encrypted online negotiation between a seller and a buyer, wherein the establishing includes creating the first digital contract by the seller, the buyer, or both the seller and the buyer, the first digital contract including one or more contractual preconditions and one or more offerings to be exchanged between the seller and the buyer;

automatically converting the first digital contract in the natural language format to a second digital contract in a legal format having one or more contractual clauses, the one or more contractual clauses including the one or more contractual preconditions and the one or more offerings;

generating a smart contract that includes one or more computer instructions corresponding to at least one contractual precondition of the one or more contractual preconditions;

generating a cryptographic digital token corresponding to the one or more offerings in the first or second digital contract;

assigning a symbolic monetary value equivalent to a cumulative price of the one or more offerings to the cryptographic digital token generated;

storing timestamped records of the first digital contract, the second digital contract, the smart contract, and the cryptographic digital token respectively in a plurality of digital ledgers simultaneously;

executing the smart contract when the at least one contractual precondition is fulfilled by the seller, the buyer, or both the seller and the buyer; and transferring the cryptographic digital token from a payer digital account of the buyer to a payee digital account of the seller upon execution.

\* \* \* \* \*